(12) United States Patent
Zheng et al.

(10) Patent No.: US 12,480,143 B2
(45) Date of Patent: Nov. 25, 2025

(54) SYSTEM AND METHOD FOR JOINTLY PRODUCING ERYTHRITOL AND LIQUID SORBITOL BY USING CORN STARCH

(71) Applicant: ZHEJIANG HUAKANG PHARMACEUTICAL CO., LTD., Quzhou (CN)

(72) Inventors: Yi Zheng, Quzhou (CN); Aijuan Wu, Quzhou (CN); Shuncheng Fang, Quzhou (CN); Chengjun Liao, Quzhou (CN); Lanlan Chen, Quzhou (CN); Jiaxing Luo, Quzhou (CN); Changhui Hu, Quzhou (CN); Fangming Zeng, Quzhou (CN); Mian Li, Santa Clara, CA (US)

(73) Assignee: Zhejiang Huakang Pharmaceutical Co., Ltd., Zhejiang (CN)

(*) Notice: Subject to any disclaimer, the term of this patent is extended or adjusted under 35 U.S.C. 154(b) by 454 days.

(21) Appl. No.: 18/024,090

(22) PCT Filed: Nov. 30, 2021

(86) PCT No.: PCT/CN2021/134594
§ 371 (c)(1),
(2) Date: Mar. 1, 2023

(87) PCT Pub. No.: WO2022/247197
PCT Pub. Date: Dec. 1, 2022

(65) Prior Publication Data
US 2023/0313236 A1 Oct. 5, 2023

(30) Foreign Application Priority Data
May 25, 2021 (CN) .......................... 202110568199.8

(51) Int. Cl.
*C12P 7/18* (2006.01)
*B01D 61/02* (2006.01)
*C07C 29/78* (2006.01)

(52) U.S. Cl.
CPC .............. *C12P 7/18* (2013.01); *B01D 61/027* (2013.01); *C07C 29/78* (2013.01)

(58) Field of Classification Search
CPC ..................................... C12P 7/18; C12P 7/14
See application file for complete search history.

(56) References Cited

U.S. PATENT DOCUMENTS

2023/0313236 A1* 10/2023 Zheng ................. B01D 61/027
435/158

FOREIGN PATENT DOCUMENTS

| CN | 102154383 | 8/2011 |
| CN | 102876732 | 1/2013 |
| CN | 104450799 | 3/2015 |
| CN | 104909986 | 9/2015 |
| CN | 113512566 | 10/2021 |

OTHER PUBLICATIONS

International Search Report and Written Opinion in International Appln. No. PCT/CN2021/134594, mailed on Mar. 1, 2022, 12 pages.

* cited by examiner

*Primary Examiner* — Tekchand Saidha
(74) *Attorney, Agent, or Firm* — Fish & Richardson P.C.

(57) ABSTRACT

The present invention relates to a system for jointly producing erythritol and liquid sorbitol by using a corn starch, including a liquefaction tank, a saccharification tank, a filter and a nanofiltration assembly. The liquefaction tank is used to perform liquefaction for the corn starch, the saccharification tank is used to perform saccharification for the liquefied material, the filter is used to filter out impurities in the saccharified material to obtain a glucose liquid, and the nanofiltration assembly is used to perform nanofiltration for the filtered glucose liquid to respectively obtain a dialysate and a concentrate. The system further includes a fermentation and crystallization assembly for performing fermentation and crystallization for the dialysate to prepare crystalline erythritol, and a hydrogenation and evaporation assembly for performing hydrogenation and evaporation for the concentrate to prepare liquid sorbitol. The present invention further provides a method of jointly producing erythritol and liquid sorbitol by using a corn starch. The present invention not only improves the purity of erythritol but also obtains liquid sorbitol, thus improving the utilization value of the corn starch.

10 Claims, 3 Drawing Sheets

SYSTEM AND METHOD FOR JOINTLY PRODUCING ERYTHRITOL AND LIQUID SORBITOL BY USING CORN STARCH

CROSS REFERENCE TO RELATED APPLICATIONS

This application is a U.S. national phase filing under 35 U.S.C. § 371 of International Application No. PCT/CN2021/134594, filed Nov. 30, 2021, which claims priority from Chinese Application No. 202110568199.8, filed May 25, 2021. The contents of the prior applications are incorporated herein by reference in their entirety.

TECHNICAL FIELD

The present invention relates to the field of sugar alcohol preparation technologies and in particular to a system and a method for jointly producing erythritol and liquid sorbitol by using a corn starch.

BACKGROUND

Erythritol is widely applied in foods and beverages and the like. At present, the methods of industrially preparing erythritol mostly are to prepare erythritol through microbial fermentation with glucose as raw material. Glucose is usually obtained by performing liquefaction, saccharification, refining, concentration and crystallization and the like in sequence with starch as raw material. If the production processes for glucose and erythritol can be integrated, it will be helpful to utilization of resources and energy. The Chinese patent with the publication number CN102154383A provides a method of preparing erythritol by using corn powder, in which fermentable glucose is obtained through liquefaction and saccharification with corn starch as raw material, where blending, enzymatic hydrolysis and fermentation cultivation are performed in a same fermentation tank, saving production processes and apparatuses of starch and glucose in the prior arts. But, the glucose content in the glucose liquid prepared through liquefaction and saccharification is about 96.0%, which, on dry basis, is smaller than >99.0% in crystalline glucose. On the other hand, there are other impurities in the glucose liquid, and these impurities need to be removed during subsequent purification of erythritol after entering fermentation process, increasing the difficulty of the purification process and affecting the entire yield.

SUMMARY

In order to solve the above technical problems, the present invention provides a system and a method for jointly producing erythritol and liquid sorbitol by using a corn starch, where the starch is liquefied and saccharified to produce a glucose liquid which then undergoes nanofiltration to produce two products erythritol and liquid sorbitol.

The present invention is achieved by providing a system for jointly producing erythritol and liquid sorbitol by using a corn starch, including a liquefaction tank, a saccharification tank, a filter and a nanofiltration assembly. The liquefaction tank is used to perform liquefaction for the corn starch, the saccharification tank is used to perform saccharification for the liquefied material, the filter is used to filter out impurities in the saccharified material to obtain a glucose liquid, and the nanofiltration assembly is used to perform nanofiltration for the filtered glucose liquid to respectively obtain a dialysate and a concentrate. The system further includes a fermentation and crystallization assembly for performing fermentation and crystallization for the dialysate to prepare crystalline erythritol, and a hydrogenation and evaporation assembly for performing hydrogenation and evaporation for the concentrate to prepare liquid sorbitol.

Furthermore, the nanofiltration assembly includes a buffer tank, a feed pump and a pre-nonfiltration filter and a high pressure pump which are communicated in sequence through a pipe, and a nanofiltration membrane assembly formed by a nanofiltration membrane and a circulation pump. The glucose liquid filtered by the pre-nanofiltration filter is nano-filtered by the nanofiltration membrane assembly to respectively obtain the dialysate and the concentrate.

Furthermore, the fermentation and crystallization assembly includes a fermentation tank, a membrane filter, a crystallization assembly and a re-crystallization assembly. The fermentation tank is used to perform fermentation for glucose ingredient in the dialysate and then convert the fermented glucose ingredient into erythritol, the membrane filter is used to remove impurities in the fermented material, and the crystallization assembly and the re-crystallization assembly are used to perform crystallization for the material filtered by the membrane filter to obtain crystalline erythritol.

Furthermore, the hydrogenation and evaporation assembly includes a hydrogenation tank, an ion exchanger and an evaporation tank. The hydrogenation tank is used to perform hydrogenation for glucose ingredient in the concentrate and then convert the hydrogenated glucose ingredient into sorbitol, and the ion exchanger and the evaporation tank are used to perform purification for the material hydrogenated by the hydrogenation tank to obtain liquid sorbitol.

The present invention is achieved by providing a method of jointly producing erythritol and liquid sorbitol by using a corn starch, which uses the above system for jointly producing erythritol and liquid sorbitol by using a corn starch. The method includes the following steps:
  at step 1, performing liquefaction, saccharification and filtration for the corn starch to obtain a glucose liquid with a solid concentration of 33% to 35%, where a glucose purity in the solids is 95.0% to 96.3%;
  at step 2, performing nanofiltration for the obtained glucose liquid to respectively obtain a dialysate and a concentrate, where a glucose purity in the dialysate is 99.0% to 99.5%, and a glucose purity in the concentrate is 80.0% to 86.0%;
  at step 3, performing fermentation, membrane filtration, crystallization and re-crystallization and the like for the obtained dialysate to obtain crystalline erythritol with an erythritol purity of >99.5%, and performing hydrogenation, ion exchange and evaporation and the like for the obtained concentrate to obtain liquid sorbitol with a sorbitol purity of >80%.

Furthermore, in step 1, the glucose liquid has a temperature of 50° C. to 60° C. and a pH of 4.0 to 5.0.

Furthermore, in step 2, the nanofiltration includes allowing the obtained glucose liquid to enter the buffer tank, and pass through the pre-nanofiltration filter through the feed pump for filtration, and then enter the nanofiltration assembly formed by the filtration membrane and the circulation pump through the high pressure pump for nanofiltration to respectively obtain the dialysate passing through the nanofiltration membrane and the concentrate not passing through the nanofiltration membrane.

Furthermore, the nanofiltration further includes using cleaning water in a cleaning tank to perform regular cleaning for the nanofiltration membrane through a cleaning pump.

Furthermore, during nanofiltration, the nanofiltration assembly has a running temperature of 40° C. to 60° C. and a running pressure of 15bar to 35bar.

Furthermore, in step 3, the dialysate undergoes heat exchange evaporation to 35% dry matter concentration before being fermented.

Compared with the prior arts, in the system and method for jointly producing erythritol and liquid sorbitol by using a corn starch, the corn starch as a raw material is liquefied and saccharified to produce a glucose liquid which then undergoes nanofiltration to produce a dialysate with a glucose content above 99% for preparing erythritol through fermentation. Compared with direct use of a glucose liquid with a glucose content of 96%, the erythritol dry basis concentration in the fermentation liquid can be increased and thus the fermentation yield can be improved and subsequent purification of the fermentation liquid is promoted. Further, the nano-filtered concentrate subjected to nanofiltration undergoes hydrogenation and ion exchange processes to produce liquid sorbitol with a sorbitol purity >80%. Hence, the present invention not only improves the purity of the erythritol but also obtains an additional product liquid sorbitol, thus improving the utilization value of the corn starch.

DETAILED DESCRIPTION OF THE EMBODIMENTS

In order to make the technical problems to be solved, the technical solutions and the beneficial effects of the present invention clearer, the present invention will be further detailed in combination with drawings and embodiments. It should be understood that the specific embodiments described herein are used only to interpret the present invention rather than limit the present invention.

Figure 1:
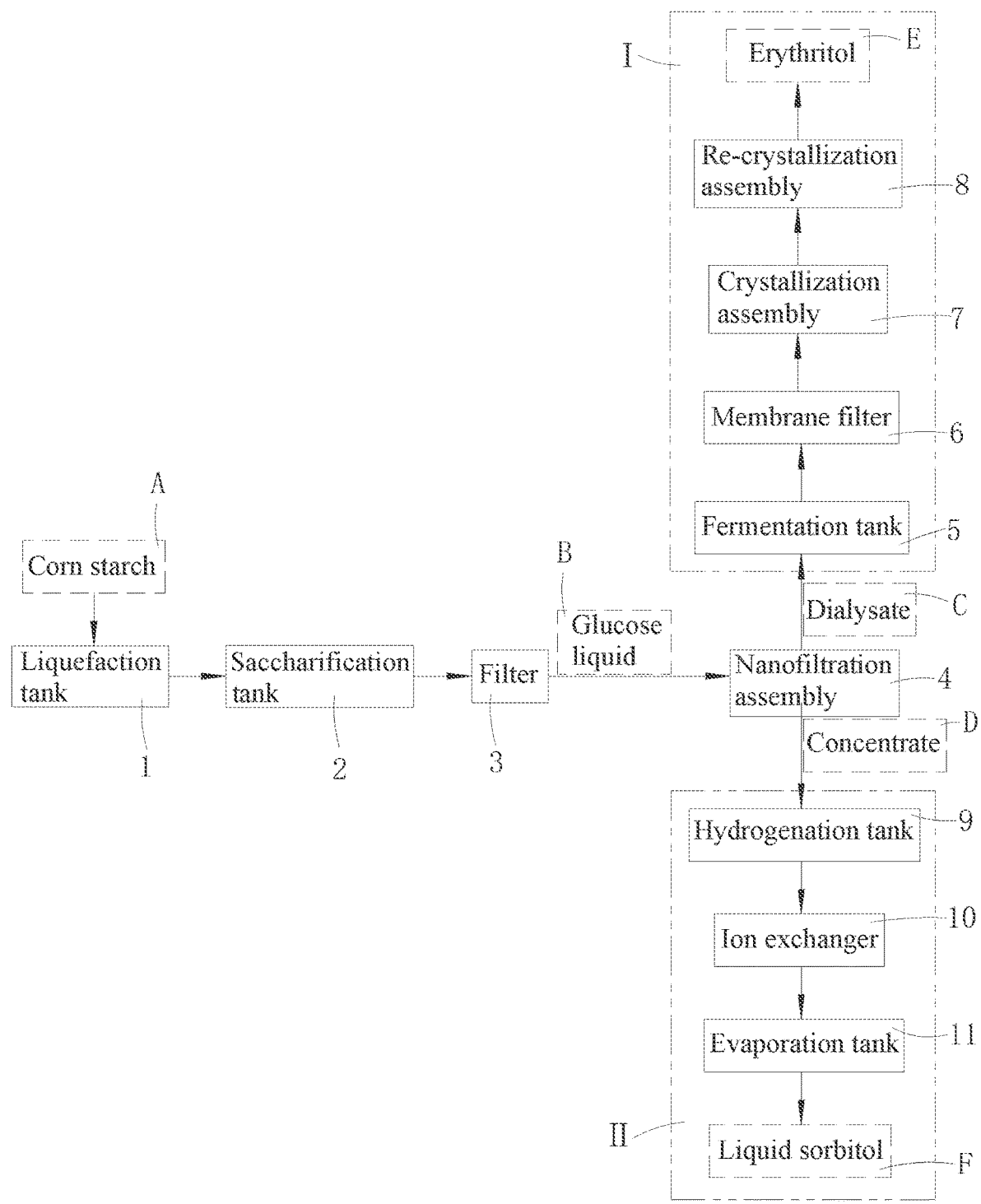
FIG. 1 is a principle schematic diagram illustrating a system for jointly producing erythritol and liquid sorbitol by using a corn starch according to an embodiment of the present invention.
Figure 2:
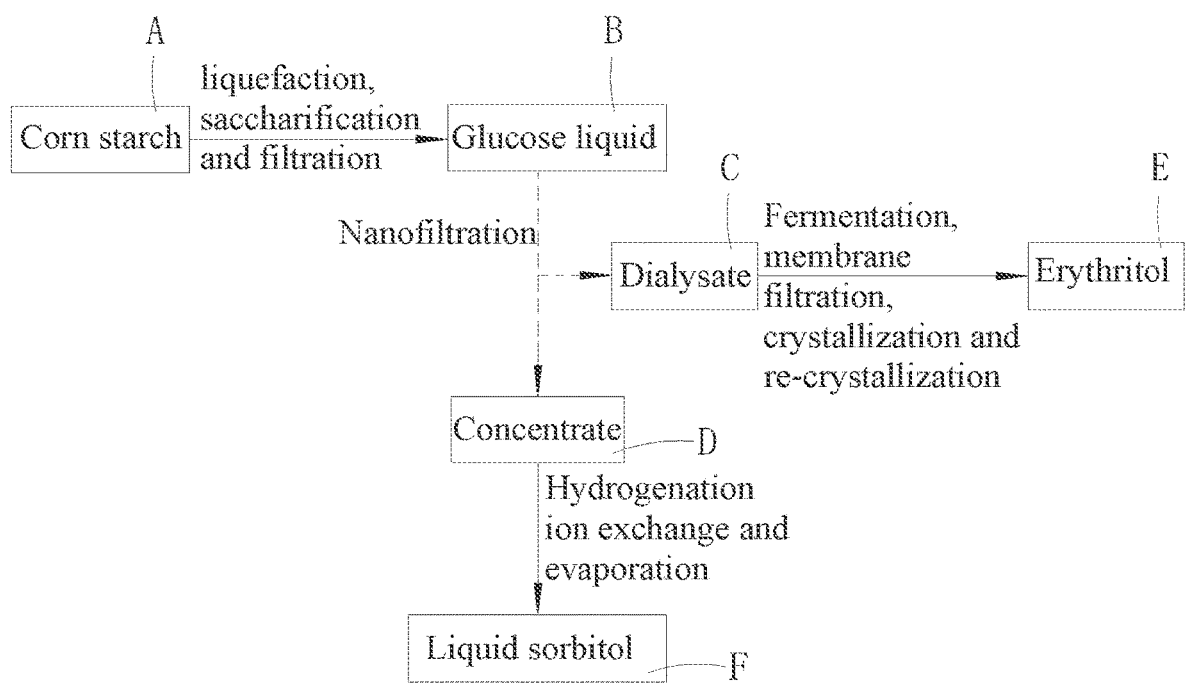
FIG. 2 is a principle schematic diagram illustrating a method of jointly producing erythritol and liquid sorbitol by using a corn starch according to an embodiment of the present invention.

By referring to FIGS. 1 and 2 at the same time, in a preferred embodiment of a system for jointly producing erythritol and liquid sorbitol by using a corn starch according to the present invention, the arrow lines in the drawings represent a flow direction of a material in the present invention. The system includes a liquefaction tank 1, a saccharification tank 2, a filter 3 and a nanofiltration assembly 4.

The liquefaction tank 1 is used to perform liquefaction for the corn starch A, the saccharification tank 2 is used to perform saccharification for the liquefied material, the filter 3 is used to filter out impurities in the saccharified material to obtain a glucose liquid B, and the nanofiltration assembly 4 is used to perform nanofiltration for the filtered glucose liquid to respectively obtain a dialysate C and a concentrate D.

The dialysate C contains micromolecular substances such as water and most glucose, and the concentrate D contains macromolecular substances such as a small portion of glucose, oligosaccharides and other heterosaccharides and the like.

The system further includes a fermentation and crystallization assembly I for performing fermentation and crystallization for the dialysate C to prepare crystalline erythritol E, and a hydrogenation and evaporation assembly II for performing hydrogenation and evaporation for the concentrate D to prepare liquid sorbitol F.

Figure 3:
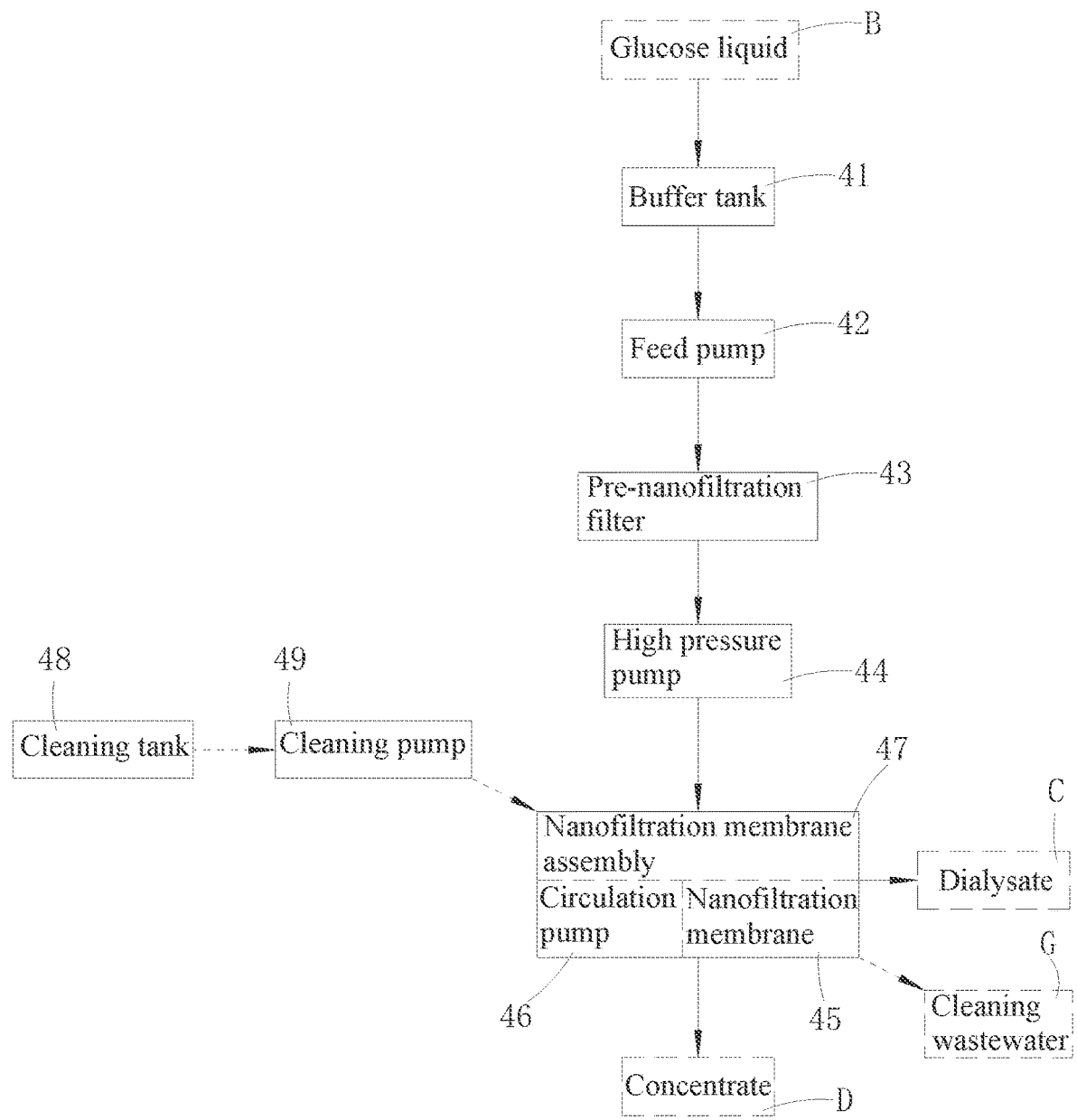
FIG. 3 is a principle schematic diagram of a nanofiltration assembly and a nanofiltration process in FIG. 1.

By referring FIGS. 1 and 3 at the same time, the nanofiltration assembly 4 includes a buffer tank 41, a feed pump 42, a pre-nonfiltration filter 43 and a high pressure pump 44 which are communicated in sequence through a pipe, and a nanofiltration membrane assembly 47 formed by a nanofiltration membrane 45 and a circulation pump 46. The glucose liquid B filtered by the pre-nanofiltration filter 43 is nanofiltered by the nanofiltration membrane assembly 47 to respectively obtain the dialysate C and the concentrate D. Micromolecular ingredients such as water and most glucose in the glucose liquid B penetrate through the nanofiltration membrane under the action of a pressure to form the dialysate C. Macromolecular ingredients such as a small portion of glucose, oligosaccharides and other heterosaccharides in the glucose liquid B are retained by the nanofiltration membrane due to their inability to penetrate through the surface of the nanofiltration membrane, so as to form the concentrate D.

The nanofiltration assembly 4 further includes a cleaning tank 48 and a cleaning pump 49. The cleaning tank 48 and the cleaning pump 49 are used to regularly clean the nanofiltration membrane 45 and a cleaning wastewater G is produced after the cleaning.

The fermentation and crystallization assembly I includes a fermentation tank 5, a membrane filter 6, a crystallization assembly 7 and a re-crystallization assembly 8. The fermentation tank 5 is used to perform fermentation for glucose ingredient in the dialysate C and then convert the fermented glucose ingredient into erythritol. The membrane filter 6 is used to remove impurities in the fermented material. The crystallization assembly 7 and the re-crystallization assembly 8 are used to perform crystallization for the material filtered by the membrane filter 6 to obtain crystalline erythritol E.

The hydrogenation and evaporation assembly II includes a hydrogenation tank 9, an ion exchanger 10 and an evaporation tank 11. The hydrogenation tank 9 is used to perform hydrogenation for glucose ingredient in the concentrate D and then convert the hydrogenated glucose ingredient into sorbitol, and the ion exchanger 10 and the evaporation tank 11 are used to perform purification for the material hydrogenated by the hydrogenation tank 9 to obtain liquid sorbitol F.

The present invention further provides a method of jointly producing erythritol and liquid sorbitol by using a corn starch, which uses the above system for jointly producing erythritol and liquid sorbitol by using a corn starch. The method includes the following steps.

At step 1, liquefaction, saccharification and filtration are performed for the corn starch to obtain a glucose liquid B with a solid concentration of 33% to 35%; where a glucose purity in the solids is 95.0% to 96.3%. The liquefaction, saccharification and filtration processes are existing mature processes and will not be redundantly described herein.

At step 2, nanofiltration is performed for the obtained glucose liquid B to respectively obtain a dialysate C and a concentrate D, where a glucose purity in the dialysate C is 99.0% to 99.5%, and a glucose purity in the concentrate D is 80.0% to 86.0%.

At step 3, fermentation, membrane filtration, crystallization and re-crystallization and the like are performed for the obtained dialysate C to obtain crystalline erythritol E with an erythritol purity of >99.5%, and hydrogenation, ion exchange and evaporation and the like are performed for the obtained concentrate D to obtain liquid sorbitol F with a sorbitol purity of >80%. The fermentation, membrane filtration, crystallization and re-crystallization processes and the like are existing mature processes, and the hydrogenation, ion exchange and evaporation processes and the like are also existing mature processes, and thus redundant descriptions are not made herein.

Specifically, in step 1, the glucose liquid B has a temperature of 50° C. to 60° C. and a pH of 4.0 to 5.0.

Specifically, in step 2, the nanofiltration includes allowing the obtained glucose liquid B to enter the buffer tank 41, and pass through the pre-nanofiltration filter 43 through the feed pump 42 for filtration, and then enter the nanofiltration assembly 47 formed by the filtration membrane 45 and the circulation pump 46 through the high pressure pump 44 for nanofiltration to respectively obtain the dialysate C passing through the nanofiltration membrane 45 and the concentrate D not passing through the nanofiltration membrane 45.

The nanofiltration further includes using cleaning water in the cleaning tank 48 to perform regular cleaning for the nanofiltration membrane 45 through the cleaning pump 49.

During nanofiltration, the nanofiltration assembly has a running temperature of 40° C. to 60° C. and a running pressure of 15bar to 35bar.

Specifically, in step 3, the dialysate undergoes heat exchange evaporation to 35% dry matter concentration before being fermented.

The method of jointly producing erythritol and liquid sorbitol by using a corn starch according to the present invention is further described below by using the specific embodiments.

Embodiment 1

In the first embodiment of the method of jointly producing erythritol and liquid sorbitol by using a corn starch according to the present invention, 96% glucose liquid was firstly nanofiltered and then erythritol was prepared by fermentation and liquid sorbitol was prepared by hydrogenation.

The method of jointly producing erythritol and liquid sorbitol by using a corn starch includes the following steps: one ton, on dry basis, of the glucose liquid B with a purity of 96.0% prepared by performing liquefaction, saccharification and filtration for the corn starch A was nano-filtered to respectively obtain 0.8 tons, on dry basis, of the dialysate C with a glucose purity of 99.0% and 0.2 tons of the concentrate D with a glucose purity of 85.5%; the dialysate C underwent fermentation, membrane filtration, crystallization and re-crystallization and the like to finally obtain 0.43 tons of crystalline erythritol E where the conversion rate from glucose to erythritol was 53.75%; further, the concentrate D underwent hydrogenation, ion exchange and evaporation and the like to obtain 0.2 tons, on dry basis, of liquid sorbitol F.

Control Embodiment

96% glucose was directly used to prepare erythritol by fermentation in the following steps: 0.8 tons, on dry basis, of glucose liquid with a purity of 96% directly underwent fermentation, membrane filtration, crystallization and re-crystallization and the like to obtain 0.42 tons of crystalline erythritol. The conversion rate from glucose to erythritol was 52.5%. As can be seen from the embodiment 1 and the control embodiment 1, under the condition of a same dry basis amount of glucose, the conversion rate at which the 96% glucose liquid is directly used to prepare erythritol through fermentation is lower than the conversion rate at which the dialysate produced by the glucose liquid through nanofiltration is used to prepare erythritol. Since the purity of the glucose in the dialysate is higher than 99%, it is higher than the purity of the glucose liquid before dialysis.

The above descriptions are made only to preferred embodiments of the present invention and shall not be intended to limit the present invention. Any changes, equivalent substitutions and improvements and the like made within the spirit and principle of the present invention shall fall within the scope of protection of the present invention.

The invention claimed is:

1. A system for jointly producing erythritol and liquid sorbitol by using a corn starch, comprising a liquefaction tank, a saccharification tank, a filter, a nanofiltration assembly, a fermentation and crystallization assembly, and a hydrogenation and evaporation assembly;
wherein
the liquefaction tank is configured to perform liquefaction for the corn starch to obtain a liquefied material,
the saccharification tank is configured to perform saccharification for the liquefied material to obtain a saccharified material,
the filter is configured to filter out impurities in the saccharified material to obtain a glucose liquid,
the nanofiltration assembly is configured to perform nanofiltration for the glucose liquid to respectively obtain a dialysate and a concentrate,
the fermentation and crystallization assembly is configured to perform fermentation and crystallization for the dialysate to prepare crystalline erythritol, and
the hydrogenation and evaporation assembly is configured to perform hydrogenation and evaporation for the concentrate to prepare liquid sorbitol.

2. The system of claim 1, wherein the nanofiltration assembly comprises a buffer tank, a feed pump, a pre-nonfiltration filter and a high pressure pump which are communicated in sequence through a pipe, and a nanofiltration membrane assembly formed by a nanofiltration membrane and a circulation pump; and the nanofiltration assembly is configured to filter the glucose liquid by the pre-nanofiltration filter and the nanofiltration membrane assembly to respectively obtain the dialysate and the concentrate.

3. The system of claim 2, wherein the fermentation and crystallization assembly comprises a fermentation tank, a membrane filter, a crystallization assembly and a re-crystallization assembly, the fermentation tank is configured to perform fermentation for glucose ingredient in the dialysate and convert the fermented glucose ingredient into erythritol in a fermented material, the membrane filter is configured to remove impurities in the fermented material, and the crystallization assembly and the re-crystallization assembly are configured to perform crystallization for the fermented material filtered by the membrane filter to obtain crystalline erythritol.

4. The system of claim 3, wherein the hydrogenation and evaporation assembly comprises a hydrogenation tank, an ion exchanger and an evaporation tank, the hydrogenation tank is configured to perform hydrogenation for glucose ingredient in the concentrate and convert the hydrogenated glucose ingredient into sorbitol in a hydrogenated material, and the ion exchanger and the evaporation tank are configured to perform purification for the hydrogenated material to obtain liquid sorbitol.

5. A method of jointly producing erythritol and liquid sorbitol by using a corn starch, which uses the system according to claim 4 and comprises the following steps:
- at step 1, performing liquefaction, saccharification and filtration for the corn starch to obtain a glucose liquid with a solid concentration of 33% to 35%; where a glucose purity in the solids is 95.0% to 96.3%;
- at step 2, performing nanofiltration for the glucose liquid to respectively obtain a dialysate and a concentrate, wherein a glucose purity in the dialysate is 99.0% to 99.5%, and a glucose purity in the concentrate is 80.0% to 86.0%;
- at step 3, performing fermentation, membrane filtration, crystallization and re-crystallization for the dialysate to obtain crystalline erythritol with an erythritol purity of >99.5%, and performing hydrogenation, ion exchange and evaporation for the concentrate to obtain liquid sorbitol with a sorbitol purity of >80%.

6. The method of claim 5, wherein in step 1, the glucose liquid has a temperature of 50° C. to 60° C. and a pH of 4.0 to 5.0.

7. The method of claim 5, wherein in step 2, the nanofiltration comprises allowing the glucose liquid to enter the buffer tank, pass through the pre-nanofiltration filter through the feed pump for filtration, and then enter the nanofiltration assembly formed by the filtration membrane and the circulation pump through the high pressure pump for nanofiltration to respectively obtain the dialysate passing through the nanofiltration membrane and the concentrate not passing through the nanofiltration membrane.

8. The method of claim 7, wherein the nanofiltration further comprises using water in a cleaning tank to clean the nanofiltration membrane through a cleaning pump.

9. The method of claim 7, wherein during nanofiltration, the nanofiltration assembly has a running temperature of 40° C. to 60° C. and a running pressure of 15 bar to 35 bar.

10. The method of claim 5, wherein in step 3, the dialysate is condensed to 35% concentration by heat exchange evaporation before being fermented.

* * * * *